Figure 1:
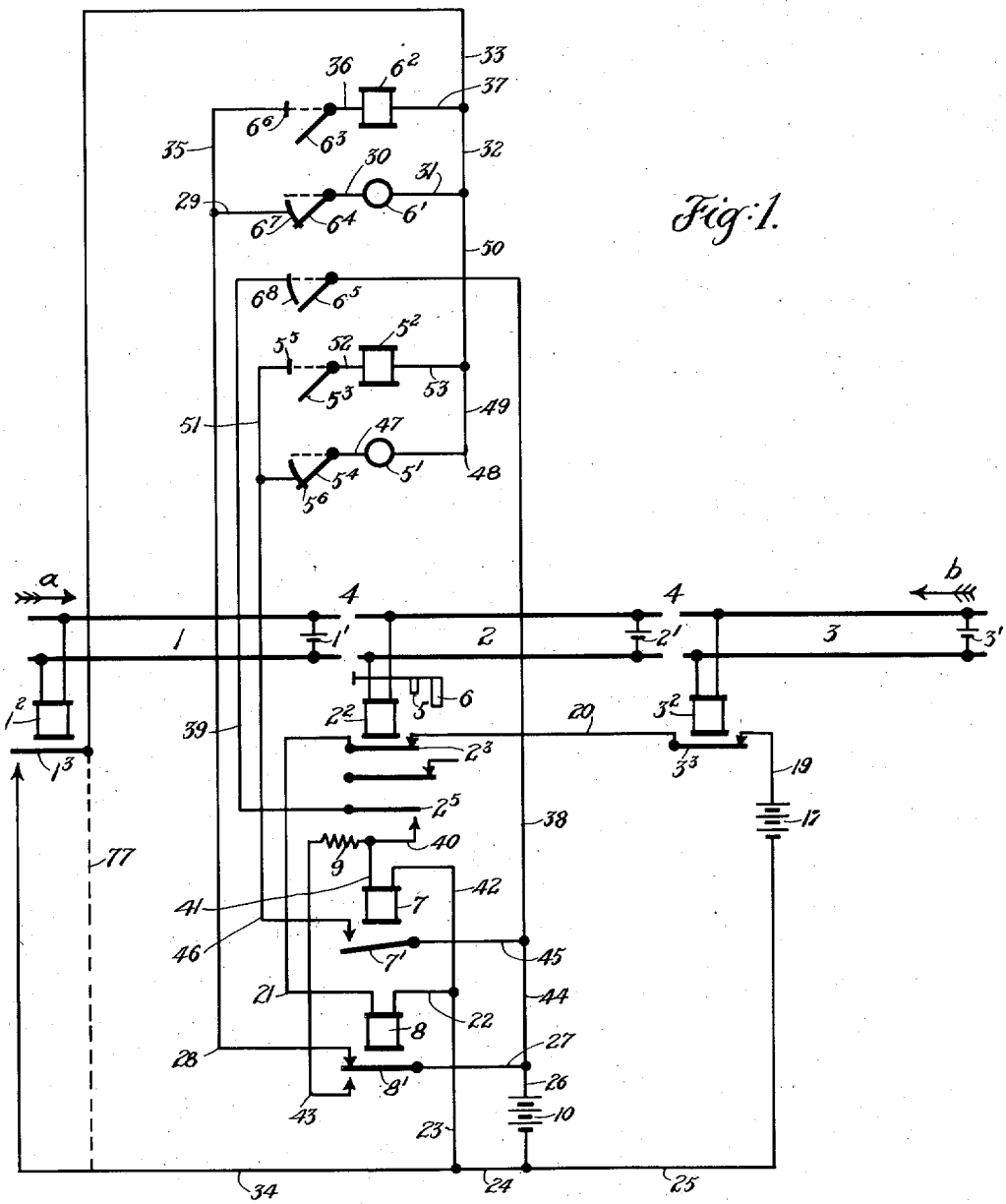

W. W. SALMON & F. L. DODGSON.

ABSOLUTE PERMISSIVE AUTOMATIC BLOCK SIGNAL SYSTEM.

APPLICATION FILED DEC. 12, 1916.

Reissued July 10, 1917. 14,326.

3 SHEETS—SHEET 1.

Wilmer W. Salmon
Frank L. Dodgson
Inventors

By their Attorneys
Edwards, Sager & Worster

W. W. SALMON & F. L. DODGSON.

ABSOLUTE PERMISSIVE AUTOMATIC BLOCK SIGNAL SYSTEM.

APPLICATION FILED DEC. 12, 1916.

Reissued July 10, 1917.

14,326.

3 SHEETS—SHEET 2.

Wilmer W. Salmon Inventors
Frank L. Dodgson

By their Attorneys
Edwards, Sager & Wooster

W. W. SALMON & F. L. DODGSON.

ABSOLUTE PERMISSIVE AUTOMATIC BLOCK SIGNAL SYSTEM.

APPLICATION FILED DEC. 12, 1916.

Reissued July 10, 1917.

14,326.

3 SHEETS—SHEET 3.

Wilmer W. Salmon Inventors
Frank L. Dodgson
By their Attorneys
Edwards, Sager & Wooster.

UNITED STATES PATENT OFFICE.

WILMER W. SALMON AND FRANK L. DODGSON, OF ROCHESTER, NEW YORK, ASSIGNORS TO GENERAL RAILWAY SIGNAL COMPANY, OF GATES, NEW YORK, A CORPORATION OF NEW YORK.

ABSOLUTE PERMISSIVE AUTOMATIC BLOCK-SIGNAL SYSTEM.

14,326. Specification of Reissued Letters Patent. Reissued July 10, 1917.

Original No. 1,174,939, dated March 7, 1916, Serial No. 607,098, filed February 7, 1911. Application for reissue filed December 12, 1916. Serial No. 136,572.

*To all whom it may concern:*

Be it known that we, WILMER W. SALMON and FRANK L. DODGSON, citizens of the United States, and residents of the city of Rochester, in the county of Monroe and State of New York, have invented certain new and useful Improvements in Absolute Permissive Automatic Block-Signal Systems, of which the following is a full, clear, concise, and exact description of the physical embodiment which we have selected to illustrate the principle of our invention, reference being had to the accompanying drawings, forming a part of the specification.

This invention relates to automatic block signal systems and is especially adapted for use on single track railways.

The object of the invention is to provide a signaling system adapted to be operated by the ordinary closed track circuits commonly used in automatic block signaling systems and adapted to secure head-on protection from passing siding to passing siding, with blocks for following train moves as short as track conditions require.

So far as known to us prior to our invention, a greater part, if not all of the single track railroads in use have employed the ordinary automatic block signal system in which a train entering the block from either direction gives the same indication and thus has the same protection for following trains as for head-on trains. Many attempts have been made to attain the results attained by our invention, but, so far as known to us, none of the systems proposed were adapted to be operated by the ordinary closed track circuits in common use on railways and all of them involved using additional and complicated apparatus or circuits, and making the operation of the signals for following movements more or less dependent upon the operation of signals governing head-on movements.

Primarily, the invention may be termed a unit system in that our means are adapted to be located at and operated by any track circuit controlling a signal governing traffic in one direction without regard to signals governing the traffic in the opposite direction; but it will be understood, of course, that in the practical embodiment of our invention the usual signals governing head-on protection are employed.

In carrying out our invention, we preferably employ a signal circuit adapted to be opened by a train on the track circuit sections of a block and a further signal circuit adapted to be closed only by a train which enters the block from one direction, both of these circuits being operated by the ordinary closed track circuit sections in common use on railroads.

This invention will be more fully described hereinafter with reference to the forms thereof herein illustrated and which we have selected as examples for the purpose of explaining the principles involved, it being understood that the invention may be embodied in various forms and arrangements of apparatus.

Figure 2:
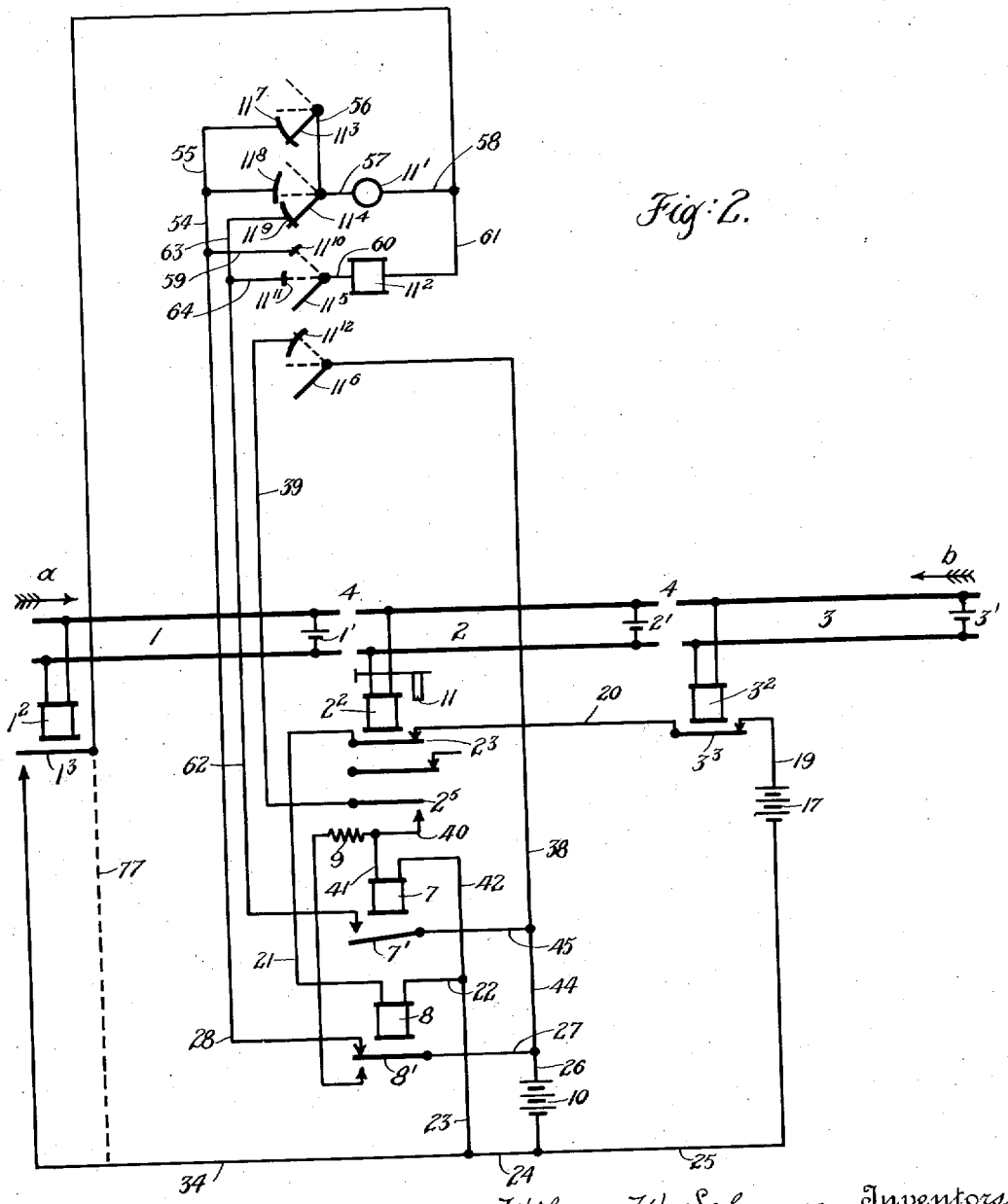
Figure 3:
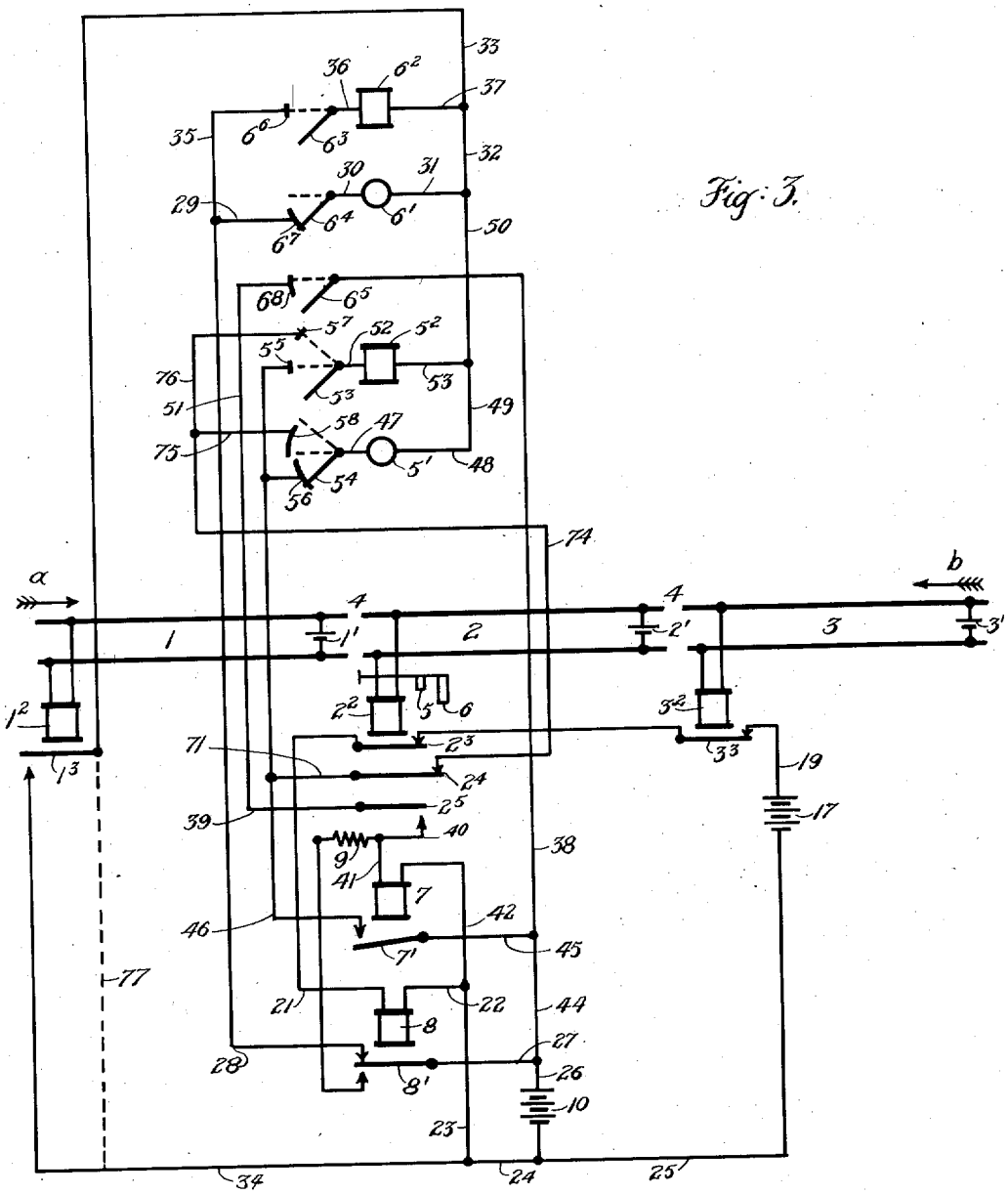

In the accompanying drawings, like reference characters denote corresponding parts throughout the several views, in which:

Figure 1, illustrates diagrammatically the circuits and apparatus of one form of our invention applied to a railway. Figs. 2 and 3 illustrate diagrammatically modified forms of our invention.

*Construction.*—Referring to Fig. 1, 1, 2, and 3 designate track circuit sections, separated by means of insulating joints 4; 1′, 2′ and 3′ designate track batteries for creating a difference of potential between the two rails of the track; $1^2$, $2^2$ and $3^2$ designate relay coils normally energized by current flowing therethrough due to the difference of potential created by the track batteries; $1^3$ designates a relay armature held normally in the upper position as shown by reason of the current flowing in relay coil $1^2$; $2^3$ and $2^5$ likewise designate armatures normally in the upper position shown by reason of current in relay coil $2^2$; $3^3$ likewise designates the armature of relay coil $3^2$ normally held in the upper position; 5 designates a semaphore as does likewise 6; 5′ and 6′ designate the electric motors for moving semaphores 5 and 6 respectively; $5^2$ and $6^2$ designate the "hold clear" devices for holding the semaphores 5 and 6 respectively in their moved position; $5^3$ and $5^4$ designate metallic arms moved in unison with semaphore 5 and designed to at times make contact with metallic strips $5^5$ and $5^6$, the arm $5^3$ making contact with metallic strip $5^5$ at the 45° position of the semaphore and for a few degrees on either side of such 45° position, the arm $5^4$ making contact with metallic strip $5^8$ at the zero or danger position of the semaphore and during the whole movement of the semaphore except the last few degrees; $6^3$, $6^4$ and $6^5$ designate metallic arms moved in unison with semaphore 6, the arm $6^3$ designed to make contact with metallic strip, $6^6$ at the 45° position of the semaphore and for a few degrees on either side of said 45° position, $6^4$ making contact with metallic strip $6^7$ at the zero or danger position of the semaphore and during the whole movement of the semaphore except the last few degrees, $6^5$ not making contact at the zero or danger position of the semaphore with metallic strip $6^8$ but making contact therewith as soon as the semaphore has moved a few degrees and remaining in contact therewith during the whole of the remainder of the movement of the semaphore; 8 designates a relay coil which when current passes therethrough causes armature 8′ to be held in its upper position; 7 designates a relay coil which when a current of sufficient value passes therethrough will draw armature 7′ to the upper limit of its movement; 9 designates a resistance which is of such value that it will allow sufficient current to pass therethrough to sufficiently energize coil 7 so that it will hold armature 7′ in its upper position if already there but will not allow sufficient current to pass therethrough to sufficiently energize coil 7 so that it will move armature 7′ to its upper position, if it is in its lower position.

In the arrangement shown in Fig. 2, only one semaphore 11 is employed having three positions; 11′ designates the motor for moving the semaphore to its different positions; $11^2$ designates the "hold clear" device for holding it in each of its moved positions; $11^3$, $11^4$, $11^5$ and $11^6$ designate metallic arms adapted to contact at times with metallic strips $11^7$, $11^8$, $11^9$, $11^{10}$, $11^{11}$, $11^{12}$; $11^{13}$ contacts with $11^7$ from zero or danger position almost to the 45° or caution position; $11^4$ contacts with $11^9$ from zero or danger position almost to the 45° or caution position and with $11^8$ from just below the 45° position almost to the full clear or 90° position; $11^5$ contacts with $11^{10}$ at and for a few degrees on each side of the full clear or 90° position and with $11^{11}$ at and for a few degrees each side of the 45° position; $11^6$ contacts with $11^{12}$ from the 90° position almost but not quite to the 45° position.

The only additional elements of construction shown in Fig. 3, not operably connected in Fig. 1, are the relay armature $2^4$ actuated by the relay coil $2^2$ and the additional circuit breaker parts operated by semaphore arm 5.

*Operation.*—In the normal condition of the connections as shown in Fig. 1, relay 8 is energized by current in the following circuit: positive terminal of battery 17, wire 19, relay armature $3^3$, wire 20, relay armature $2^3$, wire 21, relay coil 8, wires 22, 23, 24 and 25 to the negative terminal of battery 17; the relay coil being thus energized the armature 8′ is normally held in its upper position.

If a train moving in the direction of the arrow *a* in Fig. 1, comes upon section 1, it will shunt the relay $1^2$, thereby dropping the armature $1^3$ so that it makes connection with its back contact, thereby establishing the following circuit: positive terminal of battery 10, wires 26 and 27, armature 8′, wires 28 and 29, metallic strip $6^7$, arm $6^4$, wire 30, motor 6′, wires 31, 32 and 33, relay armature $1^3$, wires 34 and 24 to the negative terminal of battery 10. The current flowing in such path will cause the motor to operate to move the semaphore to the 45° or clear position, causing the arm $6^4$ to move over metallic strip $6^7$ until the semaphore almost reaches the 45° position when arm $6^4$ will break contact with strip $6^7$ thus stopping the motor, but at the 45° position of the semaphore the arm $6^3$ will make contact with metallic strip $6^6$ so that the current which formerly flowed through the motor will now flow through the hold clear device from the wire 28 by the following path: wire 28, wire 35, strip $6^6$, arm $6^3$, wire 36, holding coil $6^2$, wire 37 to wire 33 and so by the before traced path to the negative terminal of the battery. The current flowing in such last traced path will cause the semaphore to be held in its 45° or clear position. As soon however as the train which entered section 1, enters section 2, the relay coil $2^2$ will be shunted, the armature $2^3$ will break contact with wire 20 and therefore the current through relay coil 8 will cease causing armature 8′ to fall stopping the flow of current through the holding coil, which consequently permits the semaphore 6 to fall to the zero or danger position to protect the train. The semaphore 6 will remain at danger and cannot be moved to the 45° position so long as a train is on section 2 or 3 for under such conditions the energizing circuit for relay coil 8 is broken either by the dropping or armature $2^3$ or armature $3^3$ depending on whether a train is on section 2 or 3. As soon, however, as the train which passed signal 6 passes the end of track section 3, the relay 8 will again become energized, relay armature 8′ will be lifted and the system would then be in condition to be again operated as before.

When a train enters section 2 traveling in the direction of the arrow *a* the semaphore 6 is, at that instant, in the 45° or clear position so that arm $6^5$ makes contact with strip $6^8$ and as by the entrance of the train on section 2 the armatures 8′ and $2^5$ are allowed to fall for reasons heretofore explained, a circuit is formed as follows: positive terminal of battery 10, wires 26, 44 and 38, arm $6^5$, strip $6^8$, wire 39, armature $2^5$, wires 40 and 41, relay coil 7, wires 42, 23 and 24 to the negative terminal of battery 10. The current flowing in the above-mentioned circuit sufficiently energizes coil 7 so that it lifts armature 7′, thereby rendering effective another circuit as follows: positive terminal of battery 10, wires 26 and 27, armature 8′, wire 43, resistance 9, wire 41, relay coil 7, wires 42, 23 and 24 to the negative terminal of the battery. The current flowing in this last traced circuit it will be observed does not depend upon the position of semaphore 6 for its continuity, but due to the resistance 9 the current flowing is only sufficient to hold the armature 7′ in its upper position, but is not sufficient to raise the armature if it is down, it being necessary to have a circuit made through arm $6^5$ and strip $6^8$ to cause sufficient current to flow through relay coil 7 to raise armature 7′, so that after 7′ has once been raised by the entrance of a train upon section 2 traveling in the direction of the arrow *a*, it will remain in its upper position during the time the said train is on either section 2 or 3, but will fall to its lower position as soon as the train leaves section 3, as the relay coil 8 will then lift armature 8′ and break the circuit through coil 7.

If a second train should approach traveling in the direction of the arrow *a* before the first train had left sections 2 or 3 so that armature 7′ was still in its upper position, upon entering section 1, it would shunt relay coil $1^2$ and cause armature $1^3$ to drop, thus closing the following circuit: positive terminal of battery 10, wires 26, 44 and 45, armature 7′, wire 46, strip $5^6$, arm $5^4$, wire 47, motor 5′, wires 48, 49, 50, 32 and 33, armature $1^3$, wires 34 and 24 to the negative terminal of battery 10. The current in said circuit would operate the motor 5′ to move the semaphore 5 to the 45° position at which point arm $5^4$ would break contact with strip $5^6$, thus cutting off the current from the motor, but at the same time the current which was flowing through the motor would be directed through the hold clear device $5^2$ flowing from wire 46 to wire 51, strip $5^5$, arm $5^3$, wire 52, holding coil $5^2$, wire 53 to wire 50 and to the negative terminal of the battery as before, thus holding the semaphore in its 45° position. It is to be observed that the said second train would not be able to clear semaphore 6 if a train were in either section 2 or 3 for the very presence of a train on either of said sections de-energizes relay 8, thus causing armature 8′ to be in its lower position, thus breaking the operating circuit for semaphore 6.

When the second train passes semaphore 5, it goes to the zero or danger position due to the fact that armature $1^3$ is drawn to its upper position, but all other parts of the system remain as before so that a third train approaching in the direction of arrow *a* would be able to operate semaphore 5 to its 45° position and so enter section 2. It will be thus seen that sections 2 and 3 could be filled with trains all going in one direction without danger of collision, and a train approaching section 2 in the direction of arrow *a* could not operate semaphore 6 until the last train had left section 3, for just so long as there is a train on section 2 or 3 relay armature 8′ would be down, thus preventing the operation of semaphore 6. It is also to be observed that as soon as the last train left section 3, the next train approaching in the direction of arrow *a* would not be able to operate the semaphore 5 for by the exit of the preceding train from section 3 relay coil 8 would be energized and armature 8′ lifted breaking circuit through coil 7, which would cause armature 7′ to drop, preventing the operating circuit of semaphore 5 from being closed by the entrance of a train on section 1.

If a train should enter section 3 traveling in the direction of arrow *b*, it would prevent all operation of the signals 5 and 6 by the subsequent entrance of a train on section 1 moving in the direction of arrow *a*, for the first said train would shunt relay $3^2$, thus causing armature $3^3$ to drop and break the energizing circuit of relay 8, which would cause armature 8′ to fall and prevent the clearing of semaphore 6 when the said subsequent train entered section 1. The dropping of relay armature 8′ would not however cause relay 7 to be energized by the circuit heretofore described for resistance 9 would not allow sufficient current to flow through relay coil 7 to energize it sufficiently to lift armature 7′, consequently the operating circuit of semaphore 5 would be broken; which condition would exist as long as the first said train remained on section 2 or 3.

Those skilled in the art of railway signaling and especially single track automatic block signaling can readily understand that the system above described accomplishes a result not before attained but long sought, for by its use all of the advantages of a signal system employing track circuits are preserved, the advantages of an automatic system are preserved and at the same time the added result of being able to govern semaphores 5 and 6 in accordance with the presence and direction of movement of a train on a track circuit section is attained.

The modification of the device as shown in Fig. 2 is governed by the track circuits and relay coils 7 and 8 exactly as in the device as shown in Fig. 1, but instead of having two semaphores the 3 indications are given by three positions of one semaphore, the full clear or 90° position of the semaphore being obtained when a train is on clearing section 1 and no train on sections 2 and 3, under which conditions armature 8′ would be in its upper position so that a circuit would be formed as follows: positive terminal of battery 10, wires 26 and 27, armature 8′, wires 28, 54 and 55, strip $11^7$, arm $11^3$, wires 56 and 57, motor 11′, wires 58 and 33, armature $1^3$, wires 34 and 24 to the negative terminal of battery 10. The current in the above traced circuit operates the motor and moves the semaphore to the 45° position, at which time arm $11^3$ breaks contact with strip $11^7$ so that current through the above traced path is cut off from the motor, but at the same time arm $11^4$ makes contact with strip $11^8$ so that a circuit is made from wire 54, through strip $11^8$ and arm $11^4$ to wire 57 and the wire 58, the current in which circuit causes the motor to further operate to move the semaphore to the full clear or 90° position, at which time $11^4$ breaks contact with strip $11^8$ cutting off current from the motor, but at the same time arm $11^5$ makes contact with strip $11^{10}$ so that a circuit is made from wire 28 through wire 59, strip $11^{10}$, arm $11^5$, wire 60, holding coil $11^2$ and wire 61 to wire 33, and the current flowing in said circuit holds the signal in the full clear or 90° position, in which position it remains until the train enters on section 2 at which time the semaphore returns to the danger or zero degree position because the holding circuit is broken by the shunting of relay $2^2$, the deënergization of relay 8 and the consequent dropping of relay armature 8′.

When semaphore 11 was in the full clear position, the pick-up circuit for armature 7′ was made through arm $11^6$ and strip $11^{12}$ just as it was made as shown in Fig. 1 and after such circuit was made the holding circuit through relay 7 acted to hold the armature 7′ in its upper position.

If a train traveling in the direction of arrow *a* enters section 1 before a preceding train has cleared sections 2 or 3, the shunting of relay coil $1^2$ and the consequent dropping of armature $1^3$ would complete the following circuit: positive terminal of battery 10, wires 26, 44 and 45, armature 7′, wires 62 and 63, strip $11^9$, arm $11^4$, wire 57, motor 11′, wires 58 and 33, armature $1^3$, wires 34 and 24 to the negative terminal of battery 10, and the current flowing in said circuit would operate motor 11′ to move the semaphore to the 45° position, at which point arm $11^4$ would break contact with strip $11^9$ and current would flow from wire 62 to wire 64, strip $11^{11}$, arm $11^5$, wire 60 through the holding coil $11^2$ to wire 61 and thence to wire 33, energizing the holding coil and holding the semaphore in the 45° position. When the second train had entirely entered on section 2 the semaphore would fall to the danger position by reason of armature $1^3$ being drawn up, breaking the holding circuit, but subsequent trains approaching semaphore 11, would move semaphore 11 to the 45° position until all trains had left sections 2 and 3, after which the next train approaching signal 11 traveling in the direction of arrow *a* would move semaphore 11 to the full clear position. A train entering section 3 traveling in the direction of arrow *b* would not pick up armature 7′ for the pick up circuit would be broken at arm $11^6$, therefore a subsequent train entering section 1 traveling in the direction of arrow *a* could not move semaphore 11 to either of its operated positions.

It is to be observed that whereas the aspects under different conditions of semaphore 11 are different from those of semaphores 5 and 6, that the indications given by one semaphore 11 are exactly the same as given by two semaphores 5 and 6.

In Fig. 3 is shown a modification of Fig. 1, wherein semaphore 5 is caused to have different aspects according to whether a train which has passed semaphore 5 going in the direction of arrow *a* is in section 2 or section 3. This is accomplished by giving to semaphore 5 one more position than it had in the form illustrated by Fig. 1, so that when a train is on section 2, semaphore 5 could be moved to the 45° position, but when the train is on section 3 it could be moved to the 90° position.

A train approaching semaphores 5 and 6 from the direction of the arrow *a* will first enter upon section 1, and as in the form shown by Fig. 1, if no train is on section 2 or 3 semaphore 6 will be moved to the 45° position, allowing the train to proceed at full speed past the signal and, as was the case in the form shown by Fig. 1, if a train was on either section 2 or 3 and had entered upon section 2 or 3 from the direction of the arrow *b*, the train approaching from the direction of the arrow *a* would receive no proceed signal at all. If, however, a train approached in the direction of arrow *a* while a preceding train was on section 2, the semaphore arm 6, as was the case in Fig. 1, would not be moved but the semaphore arm 5, as was the case in the form shown in Fig. 1, would move to the 45° position. In the form shown by Fig. 3, however, in order to differentiate the condition of the presence of a train in section 2 from that when a train is in section 3, the semaphore 5 would move to the 90° position if a train approached in the direction of the arrow *a* while a preceding train was on section 3, the circuit for such a movement when relay armature 7′ is in its upper position due to the passing of a train in the direction of arrow *a* beyond the semaphores 5 and 6 being as follows: positive side of battery 10, wires 26, 44, 45, armature 7′, wires 46, 71, armature $2^4$, wires 74 and 75, metallic strip $5^8$, arm $5^4$, wire 47, motor 5′, wires 48, 49, 50, 32, 33, armature $1^3$, wires 34 and 24 to the negative terminal of the battery 10. The current flowing in the above traced path would cause the motor to operate and move the semaphore 5 to its 90° position, it, of course, being moved previously by the same circuit as described in Fig. 1, to the 45° position and after it has been moved by current in this last traced path to the 90° position, the current would then pass by wire 76 to metallic strip $5^7$, arm $5^3$ and wire 52 to the hold clear coil $5^2$, and thence to the negative terminal of the battery by wire 53 as in the case when the motor was being operated.

It will thus be understood that in the form of the invention illustrated by Fig. 3, a train approaching semaphores 5 and 6 in the direction of the arrow *a* will be given a distinctive aspect to the presence of a train on either sections 2 or 3.

Although applicants have selected the well-known normal danger system of operating signals in connection with the embodiment of their invention which they have selected to illustrate the principle of their invention, it is to be distinctly understood that it is immaterial whether the so-called normal danger system of signaling is employed in connection with this invention or whether the so-called normal clear system is employed for, to transpose from the normal danger system to the normal clear system would simply mean the absence of the preliminary clearing section 1, shown in each of the figures, and in place thereof the substitution of the conductor shown by dotted line 77 in each of the figures. It is furthermore to be observed that the aspects of the signals would either with the normal danger or the normal clear systems be identical and that under the same conditions as regards the presence of a train which has passed the semaphores 5 and 6, the aspects of the signal displayed to an approaching train would in the two systems be identical.

In practice all of the systems shown would be duplicated for single track, the opposing semaphore corresponding to semaphores 5 and 6 and 11 being in the well-known manner interlocked electrically, that is, 5 and 6 and 11 at one end of the block with 5 and 6 and 11 at the other end, and all would be controlled by the same track circuit sections, so that a train approaching a semaphore in either direction would, if semaphore 6 or 11 moved to the clear position, enter the block controlled thereby at full speed. If the arm 5 moved to the 45° position, or in case 11 was used it moved to the 45° position, the train would enter the block under control. If neither semaphore assumed the 45° position, the approaching train would not enter the block.

Although we have herein shown and described the relay 7 as governing a semaphore 5 or a position of a semaphore 11, it is to be understood that such are only single instances of an exhibition of its functions. In its broadest aspect the principle of relay 7 may be employed in controlling one or more aspects of any semaphore, located at any point, having a plurality of aspects, when such semaphore should have some one or more of its aspects controlled by the presence and direction of movement of a train on the track circuit sections controlling relay 7, and it is immaterial whether or not such semaphore is also jointly controlled in its aspects by other means, and therefore we desire it to be understood that such applications being well within the skill of those learned in the art of railway signaling would embody the principle of the idea of means herein set forth.

It will be understood, of course, in practising our invention, the details will be modified to meet individual cases. The signals may be of any suitable type and the indications caused to occur in any well known manner and in locations according to conditions.

Having particularly described the construction and operation of physical embodiments of our invention and explained the operation and principle thereof, what we claim as new and desire to protect by Letters Patent is:

1. In a railway signal system; a signal having a biased aspect and a plurality of operated aspects; a closed track circuit; a relay controlled by said closed track circuit; a normally closed circuit containing a second relay controlled by the first relay; a circuit including said signal controlled by said second relay; a normally open circuit controlled by said first relay including a third relay and a circuit controller adapted to be closed in an operated aspect of the signal, said third relay adapted to be energized by the shunting of the track circuit when said circuit controller is closed; an armature raised by the energization of said third relay; a further normally open circuit including said third relay controlled by said second relay and including a limiting resistance adapted to be closed when the track circuit is shunted and adapted to maintain the armature of said third relay in the raised position after it has been moved thereto by the closing of the first mentioned normally open circuit after said circuit controller is opened; a normally open circuit including said signal controlled by the armature of said third relay; and means to furnish electrical energy to each of said circuits.

2. In a railway signal system; a block; a signal governing the entrance to one end of said block and adapted to have a normal bias aspect and a plurality of operated aspects; a closed circuited track circuit of which the rails of said block form a part; a source of energy in said circuit and a translating mechanism in said circuit; means controlled by the translating mechanism adapted for causing an operated aspect of said signal; a second translating mechanism, including a normally lowered armature; means controlled by the first-mentioned translating mechanism and the aspect of the signal adapted for energizing the second mentioned translating mechanism sufficiently for raising its normally lowered armature; means controlled by the first-mentioned translating device operative to retain the said armature in its raised position after being raised thereto while said first-mentioned translating mechanism is deënergized; means governed by the armature of said second translating mechanism adapted to cause another operated aspect of said signal.

3. In a railway signal system; a signal having a biased aspect and an operated aspect; a closed track circuit; a translating device controlled by the closed track circuit; a normally closed circuit containing a second translating device controlled by the first-mentioned translating device; a circuit for controlling the operated aspect of the signal controlled by the second-mentioned translating device; a normally open circuit controlled by the first-mentioned translating device including a third translating device and a circuit controller adapted to be closed in the operated aspect of the signal; the third-mentioned translating device including a normally lowered armature; the third-mentioned translating device adapted to be sufficiently energized by the shunting of the track circuit when the circuit controller is closed for raising the normally lowered armature; a second normally open circuit controlled by the second-mentioned translating device and including the third-mentioned translating device and a limiting resistance adapted to be closed when the track circuit is shunted and adapted to maintain the armature of said third-mentioned translating device in the raised position after being moved thereto by the closing of the first-mentioned normally open circuit after said first-mentioned circuit controller is opened; a normally open circuit for signaling controlled by the armature of said third-mentioned translating device; and means to furnish electrical energy to each of said circuits.

4. In a railway signal system; a signal having a biased aspect and an operated aspect; a closed track circuit; another closed track circuit; a translating device controlled by the first-mentioned track circuit; a translating device controlled by the second-mentioned track circuit; a normally open circuit controlled by both of the translating devices, said normally open circuit adapted to govern the signal; a second normally open circuit controlled by the second-mentioned translating device including a third translating device and a circuit controller controlled by the aspect of the signal; said third-mentioned translating device including a normally lowered armature; said third-mentioned translating device adapted to be sufficiently energized by the shunting of the second-mentioned translating device when the circuit controller is closed to raise the normally lowered armature; a third normally open circuit including the third-mentioned translating device and a limiting resistance adapted to be closed when the second-mentioned translating device is shunted and adapted to maintain the third-mentioned translating device sufficiently energized to retain its armature in its raised position after being raised thereto after the said circuit controller is opened; a fourth normally open circuit for signaling controlled by the armature of the third-mentioned translating device and the first-mentioned translating device; and means to furnish electrical energy to each of said circuits.

5. In a railway signal system; a closed track circuit; a second closed track circuit; a signal circuit; means controlled by the said track circuits for governing said signal circuit; a normally open energizing circuit including a relay; means for closing said normally open energizing circuit controlled by the signal circuit and by a track circuit; a normally open holding circuit including the said relay; said normally open holding circuit controlled by said first-named means; and means controlled by said relay for signaling.

6. In a railway signal system: a signal a translating device; a second translating device; a third translating device; a circuit for said signal governed by the first two mentioned translating devices; an energizing circuit for said third translating device; a holding circuit for said third translating device; means controlled by the first two mentioned translating devices to complete the energizing circuit and the holding circuit for the third-mentioned translating device; means controlled by the third-mentioned translating device for governing the signal.

7. In a railway signaling system, a trackway composed of two lines of electrically conductive rails, a section of the track rails separated by insulating joints from the rest of the trackway, a source of electricity having two terminals, each of said terminals connected to one of the track rails of the section, a translating device having two terminals, each of said terminals connected to one of the track rails of the section at a distance from the connections of the source of electricity, a second section of the track rails separated by insulating joints from the rest of the trackway, a source of electricity having two terminals, each of said terminals connected to one of the track rails of the second section, another translating device having two terminals, each of said terminals connected to one of the track rails of the second section at a distance from the connections of the source of electricity, a normally closed circuit, means controlled by the said normally closed circuit for signaling, means controlled by said translating devices for governing said normally closed circuit, a normally open circuit, means for closing said normally open circuit controlled by said normally closed circuit, means to maintain closed said normally open circuit controlled by the normally closed circuit, and means controlled by the said normally open circuit for signaling.

8. In a railway signaling system, a closed track circuit, a second closed track circuit, each of said circuits including a translating device, a normally closed circuit governed by the translating devices, means controlled by the said normally closed circuit for signaling, a normally open circuit, means for closing said normally open circuit controlled by said normally closed circuit, and the translating device of the first-mentioned track circuit, means to maintain closed said normally open circuit controlled by the normally closed circuit, and means controlled by the said normally open circuit for signaling.

9. In a railway signal system, a signal including moving and holding means, and adapted for a plurality of aspects, a block including closed circuited track circuit sections, the entrance to which in one direction is governed by said signal, means governed by said track circuit sections including a normally energized controlling device adapted for causing one of said aspects, a circuit controller governed by said one aspect of the signal, means controlled by said circuit controller adapted to be energized by the entrance of a train in one direction only upon said block, a circuit controller controlled thereby adapted to determine another aspect of said signal.

10. In a railway signaling system, a closed track circuit, a second closed track circuit, a normally closed circuit, means controlled by the said normally closed circuit for signaling, means controlled by said track circuits for governing said normally closed circuit, a normally open circuit, means for closing said normally open circuit controlled by said normally closed circuit, means to maintain closed said normally open circuit, and means controlled by the said normally open circuit for signaling.

11. In a railway signaling system, a trackway composed of two lines of electrically conductive rails, a section of the track rails separated by insulating joints from the rest of the track way, a source of electricity having two terminals, each of said terminals connected to one of the track rails of the section, a translating device having two terminals, each of said terminals connected to one of the track rails of the section at a distance from the connections of the course of electricity, a second section of the track rails separated by insulating joints from the rest of the trackway, a source of electricity having two terminals, each of said terminals connected to one of the track rails of the second section, another translating device having two terminals, each of said terminals connected to one of the track rails of the second section at a distance from the connections of the source of electricity, a normally open circuit, means to complete said normally open circuit controlled by both the translating devices, means controlled by said normally open circuit for signaling, a second normally open circuit, means for completing said second-mentioned normally open circuit controlled by said second-mentioned translating device and said first-mentioned normally open circuit, a third-normally open circuit controlled by said first-mentioned translating device and the second-mentioned normally open circuit, means rendered operative by said second-mentioned normally open circuit to maintain said third-mentioned normally open circuit partially closed, and means controlled by the third-mentioned normally open circuit for signaling.

12. In a railway signaling system, a closed track circuit, a second closed track circuit, a normally open circuit, means to complete said normally open circuit controlled by both the track circuits, means controlled by said normally open circuit for signaling a second normally open circuit, means for completing said second-mentioned normally open circuit controlled by said second-mentioned track circuit and said first-mentioned normally open circuit, a third normally open circuit controlled by said first-mentioned track circuit and the second-mentioned normally open circuit, means rendered operative by said second-mentioned normally open circuit to maintain said third-mentioned normally open circuit partially closed, and means controlled by the third-mentioned normally open circuit for signaling.

13. In a railway signaling system, a semaphore controlling mechanism, a closed track circuit, a relay controlled by said closed track circuit, a normally closed circuit containing a second relay controlled by the first relay, a circuit including said semaphore controlling mechanism controlled by said second relay, a normally open circuit controlled by said first relay including a third relay and a circuit breaker adapted to be closed by the semaphore controlling mechanism, said third relay adapted to be energized by the shunting of the track circuit when said circuit breaker is closed, a second normally open circuit including said third relay adapted to be closed when the track circuit is shunted and adapted to maintain said third relay energized after said circuit breaker is opened while said track circuit is shunted, and a third normally open circuit controlled by said third relay, a semaphore controlling mechanism controlled by the said last-named normally open circuit, and means to furnish electrical energy to each of said circuits.

14. In a railway signaling system, a block, a signal governing the entrance to one end of said block and adapted to have a biased aspect and a plurality of operated aspects, a closed circuited track circuit of which the rails of said block form a part, a source of energy in said circuit and a translating mechanism in said circuit, means controlled by the translating mechanism adapted for governing an operated aspect of said signal, another translating mechanism, means controlled by the first-named translating mechanism and the aspect of the signal adapted for energizing said other translating mechanism, and means governed by said last-named translating mechanism adapted to govern another operated aspect of said signal, means rendered operative by the energization of said last-named translating mechanism to control said last-named means.

15. In a railway signaling system, a semaphore controlling mechanism, a block, a closed circuited track circuit of which the rails of said block form a part, a source of energy in said circuit and a translating mechanism in said circuit, means controlled by the translating mechanism adapted for governing the semaphore controlling mechanism, another translating mechanism, means controlled by the first-named translating mechanism and the semaphore controlling mechanism adapted for energizing said other translating mechanism, a semaphore controlling mechanism, means governed by said last-mentioned translating device to govern said last-named semaphore controlling mechanism, and means rendered operative by the energization of said last-mentioned translating device to control said last-named means.

16. A normally energized translating device, another normally energized translating device, a normally closed circuit including a source of electricity, means controlled by the translating devices to break the normally closed circuit, means governed by the normally closed circuit for signaling, a normally open circuit, a circuit controller controlled by the normally closed circuit, means controlled by the first-mentioned translating device and said circuit controller to complete said normally open circuit, means governed by the translating devices, to maintain said normally open circuit closed, and means governed by the normally open circuit for signaling.

17. A normally energized translating device, another normally energized translating device, a normally closed circuit, means controlled by the translating devices to break the normally closed circuit, means controlled by the normally closed circuit for signaling, a normally open circuit, means controlled jointly by the normally closed circuit and the first-mentioned translating device to close said normally open circuit, means governed similarly and solely by either of said translating devices to maintain said normally open circuit closed, and means controlled by the normally open circuit for signaling.

18. A normally energized translating device, another normally energized translating device, a normally closed circuit, means controlled by the translating devices to break the normally closed circuit, means controlled by the normally closed circuit for signaling, a normally open circuit, means controlled jointly by the normally closed circuit and the first-mentioned translating device to close said normally open circuit, means governed by each of said translating devices separately and independently to retain said normally open circuit closed, and means controlled by the normally open circuit for signaling.

19. In a railway signaling system, a closed track circuit, a second closed track circuit, a normally closed circuit, means for breaking said normally closed circuit controlled by both of said track circuits, means for signaling controlled by said normally closed circuit, a normally open circuit, means for completing said normally open circuit controlled by said first-mentioned track circuit and said normally closed circuit, a second normally open circuit including a limiting resistance and a source of electricity for maintaining said first-mentioned normally open circuit closed, means to close said second normally open circuit controlled by both of said track circuits, the limiting resistance being of such a value that it will not allow sufficient current to flow in the second normally open circuit to close said first-mentioned normally open circuit, but will allow sufficient current to flow through the second-mentioned normally open circuit to maintain the first-mentioned normally open circuit closed after being closed, and means for signaling controlled by said first-mentioned normally open circuit.

20. In a railway signaling system a semaphore having an operated position and a biased position, means for causing said semaphore to move from a biased position and be held in an operated position, a normally open circuit including a source of energy for controlling said means, a normally closed circuit, means including track circuits for governing said normally closed circuit, means for signaling controlled by said normally closed circuit, and means for closing said normally open circuit controlled by said normally closed circuit and one of the track circuits.

21. In a railway signaling system, a semaphore having an operated position and a biased position, a motor for causing said semaphore to move from the biased position to the operated position, a normally open circuit including said motor and a source of energy, a normally closed circuit, means including track circuits for governing said normally closed circuit, means for signaling controlled by said normally closed circuit, means for closing said normally open circuit controlled by said normally closed circuit, and means to maintain closed said normally open circuit controlled by said track circuits.

22. In a railway signaling system: a plurality of translating devices, a circuit including means for controlling its own continuity, the said means for controlling the continuity of the circuit being controlled by the translating devices, a normally open circuit including another translating device and including means for completing its own continuity, said last-mentioned means being controlled by the first-mentioned circuit and by one of the translating devices, means controlling the other translating device to maintain the last-mentioned translating device energized after being energized, said means being controlled by a translating device, means controlled by the first-mentioned circuits and by the normally open circuit for signaling, and a source of current for each of said circuits.

23. In a railway signaling system in combination, a semaphore, a second semaphore, a normally closed circuit for governing the first semaphore, a normally open circuit for governing the second semaphore, a trackway over which both said semaphores govern movements in the same direction, means dividing said trackway into a series of track circuit sections, means including a track circuit section for governing said first-mentioned circuit, and means governed by the operation of the track circuit sections in one sequence only including a circuit controller governed by the normally closed circuit for closing the first normally open circuit.

24. In a railway signaling system, in combination: a circuit controller having an open and a closed position and remaining temporarily in its then position after a change in its governing circuit, a governing circuit for said circuit controller, a circuit including said circuit controller, means having cooperating contacts in series with said circuit controller for closing said last-mentioned circuit only before said circuit controller moves from its temporary position after a change in its governing circuit; and means for signaling controlled jointly by said last-mentioned circuit and said governing circuit.

25. In a railway signaling system, in combination: a circuit controller, a governing circuit for said circuit controller, said circuit controller having an open and a closed position and being in closed position only when said governing circuit is closed and remaining in closed position temporarily after said governing circuit is opened, another circuit including said circuit controller, means having coöperating contacts in series with said circuit controller for closing said last-mentioned circuit, a normally open circuit, means for controlling said normally open circuit governed jointly by said another circuit and said governing circuit only before said circuit controller moves from its temporary closed position after the opening of its governing circuit, and means for signaling controlled by said normally open circuit.

26. In a railway signaling system, in combination: a signal having an operated position and a biased position, a governing circuit for said signal, a circuit controller controlled by said signal and having an open and a closed position, said circuit controller temporarily remaining in its then position after a change in said governing circuit, another circuit including said circuit controller, circuit controlling means included in said another circuit in series with said circuit controller for closing said another circuit, a signaling circuit, means for controlling the signal circuit controlled jointly by said another circuit and the governing circuit for said signal only before said circuit controller moves from its temporary position after a change in the governing circuit of said signal, and means for signaling controlled by said signaling circuit.

27. In a railway signaling system, in combination: a signal having an operated position and a biased position, a governing circuit for said signal, a circuit controller controlled by said signal and being in closed position when said signal is in operated position, said circuit controller temporarily remaining in closed position after the opening of said governing circuit, another circuit including said circuit controller, means for closing said last-mentioned circuit when said circuit controller is in its closed position, and means for signaling controlled jointly by said another circuit and said governing circuit before the said circuit controller moves from its temporary position after the opening of said governing circuit.

28. In a railway signaling system, in combination: a track circuited trackway, a circuit controller controlled by a track circuit of the trackway and remaining momentarily in closed position after the shunting of said track circuit, a circuit having therein only two points of possible break, one point being controlled by said circuit controller, means for closing said circuit at the other point, and means for signaling controlled jointly by said circuit and a track circuit of said trackway after the same has been shunted and during the time the circuit controller is momentarily in closed position.

29. In a railway signaling system, in combination: a track circuited trackway, a circuit controller controlled by a track circuit of the trackway and remaining momentarily in closed position after the shunting of said track circuit, a circuit including said circuit controller, circuit controlling means included in said circuit in series with said first circuit controller, and means for signaling controlled jointly by said circuit and said track circuit after the same has been shunted and during the time the circuit controller is momentarily in closed position.

30. In a railway signaling system, in combination: a track circuited trackway, a circuit controller having an open and a closed position and controlled by a plurality of track circuits of the trackway and momentarily in closed position after the shunting of one of said track circuits, a circuit including said circuit controller, means having coöperating contacts in series with said circuit controller for closing said circuit, means controlled jointly by said circuit and the said one track circuit after it is shunted and during the time the circuit controller is momentarily in closed position, and means for signaling controlled by said means.

31. In a railway signaling system, in combination: a track circuited trackway, a normally open circuit, a circuit controller having an open and a closed position controlled by a plurality of track circuits of the trackway and momentarily in closed position after the shunting of one of said track circuits, means controlled jointly by the circuit controller and the said one track circuit before the circuit controller moves from its temporary position after the said one track circuit is shunted for closing said normally open circuit, and means controlled by said normally open circuit for signaling.

32. In a railway signaling system, in combination: a normally closed signaling circuit, a circuit controller governed by said signaling circuit, a track circuited trackway, means controlled by said track circuited trackway for governing said normally closed signaling circuit, a relay included in two normally open circuits, one of said circuits being a preliminary energizing circuit and the other being a maintaining circuit, means including said circuit controller for closing said preliminary energizing circuit and for keeping the preliminary energizing circuit closed after the first-mentioned normally closed circuit is opened until the said maintaining circuit is closed, means controlled by said track circuited trackway for closing said maintaining circuit while the normally closed signaling circuit is open, and means for signaling controlled by said relay.

33. In a railway signaling system, in combination: a signal having a stop indication position and a proceed indication position; a track circuited trackway, a normally closed signaling circuit controlled by a portion of said track circuited trackway for governing said signal indication positions, a relay included in two normally open circuits, one of said circuits being an energizing circuit and the other being a maintaining circuit, a circuit controller governed by said signal and closed when said portion of the track circuited trackway is not shunted and the signal is in proceed indication position and remaining closed after said portion of the track circuited trackway is shunted for a sufficient length of time for said maintaining circuit to be closed, means for closing said energizing circuit including said circuit controller, means controlled by said portion of the track circuited trackway for closing said maintaining circuit, and means for signaling controlled by said relay.

34. In a railway signaling system, in combination: a signal having an operated position and a biased position, a track circuited trackway, translating devices controlled thereby, means controlled by the translating devices for governing said signal, a relay included in a normally open circuit, means for completing said normally open circuit and preliminarily energizing said relay, a circuit controller included in said circuit and governed by said signal and in closed position only when said signal is in operated position, means governed by said translating devices for maintaining said relay energized after said signal moves to biased position, and means governed by said relay for signaling.

35. In a railway signaling system, in combination: a signal having a stop indication position and a proceed indication position, a track circuited trackway, means controlled by a portion of said track circuited trackway protected by said signal for governing said signal indication positions, a circuit controller governed by said signal and closed only when the signal is in proceed indication position, a relay, means dependent on the circuit controller being in its closed position and upon a track circuit of said trackway being shunted for preliminarily energizing said relay; means for keeping said relay energized after it has been preliminarily energized while said portion of the track circuited trackway is shunted, and means for signaling controlled by said relay.

36. In a railway signaling system, in combination: a track circuited trackway including track relays, a relay included in a normally open energizing circuit and a normally open holding circuit, a circuit controller controlled by a track circuit of the trackway and open when the track relay connected to said track circuit is shunted, said circuit controller remaining momentarily in closed position after the deënergization of the track relay connected to said track circuit, means for closing said normally open energizing circuit, means controlled by the said track circuit when shunted for closing said normally open holding circuit, and means controlled by said relay for signaling.

37. A signal, two track sections, a circuit controlled by each track section and itself controlling a normal indication of said signal, a local circuit controlled by one of said track sections and operative only while the signal is unchanged to a determined degree from its normal indication, a permissive signal controlled by said local circuit, and means for continuing the indication of said permissive signal when once caused until both track sections are unoccupied.

38. Two track circuits, a circuit controller governed thereby, a signal, a controlling circuit for said signal, means for governing said last named circuit, said means being controlled jointly by one of said track circuits and said circuit controller before the circuit controller is moved to a determined degree from its then position by the operation of the track circuit.

39. A track circuit, a circuit controller governed thereby, a signal controlling circuit, means for governing said last-named circuit, a circuit for governing said means which is controlled jointly by the track circuit and the circuit controller before the circuit controller is moved to a determined degree from its then position by the operation of the track circuit, a second track circuit, and means governed thereby for governing the circuit controller.

40. A track circuited trackway, a circuit controller governed by a track circuit of said trackway, a signal, a circuit governing said signal, means for temporarily maintaining said last-named circuit between the operation of said track circuit and the movement of said controller to a determined position, a holding circuit adapted to maintain said signal, and means for establishing said holding circuit upon the operation of said track circuit and during the temporary maintenance of said signal governing circuit and for maintaining the same during a predetermined condition of the trackway.

41. A track circuited trackway, a circuit controller governed by two or more track circuits of said trackway, a signal, a circuit governing said signal, means for temporarily maintaining said last-named circuit between the operation of one of said track circuits and the movement of said controller to a determined position, a holding circuit and means for establishing said holding circuit upon the operation of said track circuit and during the temporary maintenance of said signal governing circuit and for maintaining the same during a predetermined condition of the trackway.

42. A track circuited trackway, a signal governing traffic in one direction and controlled by one or more track circuits of said trackway, another signal controlling traffic in the same direction, a normally open circuit adapted to control said another signal governing traffic in the same direction, means for temporarily maintaining said circuit during a predetermined position of said first signal when one of the track circuits governing said signal is occupied, and means for continuing said circuit during the occupancy by a train of one or more determined track sections.

43. A track circuited trackway, a signal controlled by a track circuit of said trackway, a circuit controlling a signal indication, means for rendering the same operative only during the time between the operation of said first-named track circuit and the movement of the signal to a determined position, and means controlled by another track circuit for rendering said circuit inoperative at all times.

44. A track circuited trackway, a signal controlled by a track circuit of said trackway, a circuit controlled by a track circuit of said trackway and controlling a signal indication, means for rendering the same operative only during the time between the operation of the track circuit controlling said circuit and the movement of the signal to a determined position, means controlled by another track circuit for rendering said circuit inoperative at all times, and means for continuing the operation of the signaling circuit when once established during the occupancy of a predetermined section of said track circuited trackway.

45. In a signaling system for railways, in combination: a circuit controller having an open and a closed position and remaining temporarily in its closed position after a change in its governing circuit, a governing circuit for said circuit controller, a circuit including said circuit controller, means for closing said circuit while said circuit controller is in its closed position, and means for signaling initially controlled by said last-mentioned circuit, said means after its response to a change in said last-mentioned circuit being also controlled by said governing circuit.

46. In a railway signaling system, in combination: a normally closed circuit controller, a governing circuit for said circuit controller, said circuit controller remaining closed temporarily after a change in its governing circuit, a normally open circuit including said circuit controller, and means for signaling initially controlled jointly by said last-mentioned circuit and said governing circuit and controlled solely by said governing circuit after responding to said joint control.

47. In a signaling system for railways, in combination: a stretch of trackway divided into track circuit sections, a signal governing traffic in one direction over said stretch and having a biased stop position and an operated proceed position, a governing circuit for said signal, a device adapted to be governed electrically, circuits for rendering said device effective, one of said circuits being closed temporarily while said signal is assuming its biased stop position and while a track circuit section adjacent to said signal is occupied, the other of said circuits being effective to maintain said device effective only when said device itself is effective at the time this other circuit is closed, means for closing the other of said circuits subsequent to the occupation of said adjacent track circuit section but prior to the interruption of said first circuit, said means also maintaining said second circuit closed so long as said signal remains in its biased position, and another signal controlled by said device.

48. In a signaling system for railways, in combination: a track circuit section, a circuit controller governed by said track circuit section and open when that track circuit section is occupied, another circuit controller governed by said track circuit section and closed when said track circuit section is occupied, said first circuit controller remaining closed temporarily subsequent to the occupation of said track circuit section, a device adapted to be governed electrically, a circuit for rendering said device effective and including said device and said first circuit controller, means for closing said circuit before said first circuit controller is opened by the presence of a train on said track circuit section, another circuit for maintaining said device effective which is controlled by said second circuit controller and which is initially effective only if the device itself is effective at the time this other circuit is closed, and means for signaling governed by said device.

49. In a signaling system for railways, in combination: a stretch of trackway divided into track circuit sections, a signal for governing traffic over said stretch, a circuit controller responsive to the presence of a train on a track circuit section protected by said signal and remaining temporarily closed subsequent to the occupation of said section by a train, a device adapted to be controlled electrically, means for signaling controlled by said device, an energizing circuit for said device governed jointly by said circuit controller and a track circuit section adjacent to said signal, and a maintaining circuit for said device controlled by said track circuit section protected by said signal, said maintaining circuit being initially effective only if the device itself is effective at the time said maintaining circuit is closed.

50. In a signaling system for railways, in combination: a stretch of trackway divided into track circuit sections, a circuit controller having an open position and a closed position and remaining temporarily closed after a change in its governing circuit, a governing circuit for said circuit controller, a signal, and means for governing said signal, said means being controlled jointly by said circuit controller and a track circuit section of said stretch of trackway, and being also controlled by said governing circuit alone after said means has responded to the controlling influence of said circuit controller and said track circuit section.

51. In a signaling system for railways, in combination: a stretch of trackway divided into track circuit sections, a first semaphore and a second semaphore, each having a proceed aspect and a stop aspect, a controlling circuit for the first semaphore, means for governing the second semaphore, said means being controlled jointly by said controlling circuit for said first semaphore and a track circuit section adjacent to said first semaphore, and being rendered effective when said first semaphore indicates proceed, and when said adjacent track circuit section is occupied, and means for maintaining the first-mentioned means effective so long as the first semaphore indicates stop, said last-mentioned means being initially effective only when said first-mentioned means is effective.

52. In a signaling system for railways, in combination: a stretch of trackway divided into track circuit sections, a semaphore for governing traffic in one direction over said stretch and having a proceed aspect and a stop aspect, a circuit controller subjected to the same controlling influence as said semaphore and closed when said semaphore indicates proceed, another circuit controller governed by a track circuit section adjacent to said semaphore and closed when that track circuit section is occupied, a circuit including in series both of said circuit controllers, a second semaphore for governing traffic in the same direction as said first semaphore, means for governing said second semaphore which is rendered effective when said circuit is closed, and means controlled by a track circuited portion of the trackway protected by said first semaphore for maintaining said first-mentioned means effective so long as this portion of the trackway is occupied by a train, said last mentioned means being initially effective only when said first-mentioned means is effective.

53. In a signaling system for railways, in combination: a stretch of trackway divided into track circuit sections, a semaphore for governing traffic in one direction over said stretch, a governing circuit for said semaphore, a second semaphore having a predetermined aspect when the track circuit sections protected by said first semaphore are occupied, means for modifying said predetermined aspect of said second semaphore, said means being controlled jointly by said governing circuit for said first semaphore and a track circuit section adjacent to said first semaphore, and means for maintaining said first-mentioned means effective so long as the first semaphore indicates stop, said last-mentioned means being initially dependent upon said first-mentioned means being concurrently effective.

54. In a signaling system for railways, in combination: a stretch of trackway divided into track circuit sections, a semaphore for governing traffic in one direction over said stretch, a governing circuit for said semaphore, a second semaphore having a predetermined aspect when the portion of the trackway protected by said first semaphore is occupied, means for modifying said predetermined aspect of said second semaphore, an energizing circuit for said means controlled jointly by said governing circuit for said first semaphore and a track circuit section adjacent to said first semaphore, and a maintaining circuit for said means controlled by said governing circuit of said first semaphore and initially effective only when said energizing circuit is concurrently established.

55. In a signaling system for railways, in combination: two adjacent track circuit sections, a circuit controller governed by one of said track circuit sections and closed when that section is occupied, another circuit controller governed by the other track circuit section and open when that section is occupied, a device adapted to be governed electrically, a circuit including in series said device and both of said circuit controllers, said device being rendered effective when said circuit is closed, means controlled by said second-mentioned track circuit section for maintaining said device in its effective condition, said last-mentioned means being initially effective only when said device is concurrently effective, and means for signaling governed by said device.

56. In a signaling system for railways, in combination: a stretch of trackway divided into track circuit sections, a signal, a circuit controller subjected to the same controlling influence as said signal and closed when said signal indicates proceed, another circuit controller governed by a track circuit section of said trackway, said another circuit controller being closed when said track circuit section is occupied, a device adapted to be governed electrically, a circuit for rendering said device effective when closed and including in series both of said circuit controllers, means subjected to the same controlling influence as said signal, for maintaining said device effective after it has been rendered effective by the closing of said circuit, and means for signaling governed by said device.

57. In a signaling system for railways, in combination: a stretch of trackway divided into track circuit sections, a signal, a circuit controller subjected to the same controlling influence as said signal and closed when said signal indicates proceed, another circuit controller governed by a track circuit section of the trackway, said another circuit controller being closed when said track circuit section is occupied, a device adapted to be governed electrically, a circuit for rendering said device effective when closed and including in series both of said circuit controllers, another circuit for maintaining said device effective which is normally open and which is ineffective unless said device is effective, means governed by the track section adjacent to and protected by said signal for establishing said last-mentioned circuit before said first circuit is interrupted, and means for signaling governed by said device.

58. In a signaling system for railways, in combination: two track circuit sections, a signal for governing traffic in one direction over said track circuit sections, a circuit controller governed by a track circuit section adjacent to said signal and closed when that track circuit section is occupied, another circuit controller governed by both of said track circuit sections and open when either of said track circuit sections is occupied, a circuit including in series both of said circuit controllers, and means for signaling governed by said circuit.

59. In combination: a plurality of track circuit sections each having a track relay; a line circuit controlled by the track relays of some of said track circuit sections; a signal circuit; a normally open circuit controller included in said signal circuit; means controlled jointly by said line circuit and the track relay of a particular track circuit section for closing said circuit controller when a train travels in one direction and occupies said particular track circuit section prior to occupying another track circuit section in advance thereof which controls said line circuit; said means also preventing the closure of said circuit controller when a train travels in the other direction and opens said line circuit prior to occupying said particular track circuit section.

60. In combination: a plurality of track circuit sections; a line circuit controlled by some of said track circuit sections; a signal circuit; a normally open circuit controller included in said signal circuit; means controlled jointly by said line circuit and a particular track circuit section for closing said circuit controller when a train occupies said particular track circuit section prior to occupying another track circuit section in advance thereof which controls said line circuit, said means also preventing the closure of said circuit controller when said line circuit is opened prior to the occupancy of said particular track circuit section, said means, after being coöperatively controlled by said particular track circuit section and said line circuit to close said circuit controller, continuing the closure of said circuit controller so long as said line circuit is open.

61. In combination: a track relay; a normally open circuit controller; a line relay; means governed by said track relay and said line relay in coöperation for controlling the closure of said circuit controller by a train in accordance with its direction of movement; a track circuit section near which all of the foregoing apparatus is located and with which said track relay is operatively associated; a signal circuit including said circuit controller; another track circuit section and a track relay therefor; a line circuit controlled by at least said last-mentioned track relay; said means, after being coöperatively controlled by said first-mentioned track relay and said line relay to close said circuit controller, continuing the closure of said circuit controller so long as said line circuit is open.

62. In combination: a plurality of track circuit sections; a signal circuit; a normally open circuit controller included in said signal circuit; a line circuit controlled by some of said track circuit sections; means governed by a particular track circuit section; an electrically operable device for closing said circuit controller when changed from its normal condition; said device being subjected to the joint action of said line circuit and said means and being changed from is normal condition when a train occupies said particular track circuit section prior to occupying another track circuit section in advance thereof which controls said line circuit; said device being maintained by the action of the line circuit alone in its changed condition so long as said line circuit is open after such change has been initially effected.

63. In combination: a plurality of track circuit sections; a line relay; a line circuit for said line relay controlled by some of said track circuit sections; an auxiliary relay; a pickup circuit and a holding circuit for said auxiliary relay; means for rendering the holding circuit effective only when the pickup circuit is preliminarily effective; means controlled by said line relay and a particular track circuit section for controlling said circuits to cause the pickup circuit to be preliminarily effective when a train travels in one direction and for preventing said pickup circuit from becoming preliminarily effective when a train travels in the opposite direction; said means continuing the effective action of the holding circuit after such action has been initiated so long as the line circuit is open.

64. In combination: a plurality of track circuit sections; a line circuit controlled by some of said track circuit sections; an auxiliary relay; a normally open circuit controller governed by said auxiliary relay and closed when said auxiliary relay is changed from its normal condition; controlling means for said auxiliary relay including a quick acting circuit controller and a slow acting circuit controller acting in coöperation; one of said circuit controllers being controlled by said line circuit; means for initiating the actuation of said circuit controllers substantally simultaneously by the presence of a train on a predetermined track circuit section; said controlling means, after a change in the normal condition of said auxiliary relay has been initially effected, also acting to maintain that changed condition so long as the line circuit is open; and a circuit for signaling controlled by said normally open circuit controller.

65. In combination: a plurality of track circuit sections; a signal circuit; a normally deënergized auxiliary relay for controlling said signal circuit; sequential controlling circuits for said auxiliary relay; means controlled jointly by two of said track circuit sections for establishing one of the controlling circuits upon a movement of the train in one direction over those track circuit sections; a line circuit controlled by a plurality of said track circuit sections including at least one of said two track circuit sections; means controlled by said line circuit for closing a break in the other of the controlling circuits for the auxiliary relay so long as the line circuit is open; and means for signaling controlled by said signal circuit.

66. In combination: a plurality of track circuit sections; an auxiliary relay; two sequential controlling circuits for said auxiliary relay; a particular track circuit section adjacent to which said auxiliary relay and its controlling circuits are located; a line relay; a line circuit including said line relay and controlled by a plurality of said track circuit sections; means also adjacent to a particular track circuit section and controlled jointly by that particular track circuit section and said line relay for causing simultaneous effective closure of said sequential controlling circuits when a train travels in one direction and for preventing such closure when a train travels in the opposite direction.

67. In combination: a plurality of track circuit sections; an auxiliary relay; a pickup circuit and a holding circuit for said auxiliary relay; a circuit controller included in the pickup circuit and closed when a predetermined track circuit section is occupied; a second circuit controller included in the pickup circuit and opened when another predetermined track circuit section is occupied; a third circuit controller included in the holding circuit and closed when said second-mentioned predetermined track circuit section is occupied; said circuit controllers causing temporarily a substantially simultaneous effective closure of said pickup circuit and said holding circuit when a train travels in one direction and preventing such closure when a train travels in the opposite direction.

68. In combination: a plurality of track circuit sections; two circuit controllers governed by said track circuit sections and being opened and closed respectively when said track circuit sections are occupied; one of said circuit controllers being adapted to act quicker than the other; an auxiliary relay; two sequential controlling circuits for said auxiliary relay each controlled by one of said two circuit controllers independently of the other circuit controller.

69. In combination: a plurality of track circuit sections; a line circuit controlled by some of said track circuit sections; an auxiliary relay; a pickup circuit and a holding circuit for said auxiliary relay; a circuit controller in the pickup circuit; a second circuit controller in the holding circuit; said circuit controllers being both controlled by said line circuit and being opened and closed respectively when said line circuit is opened; a third circuit controller in the pickup circuit controlled by a track circuit section; said pickup circuit and said holding circuit being controlled by their respective circuit controllers to cause an energization of said auxiliary relay which continues so long as said line circuit is open when a train travels in one direction and to prevent such continuing energization when a train travels in the opposite direction.

70. In combination: a plurality of track circuit sections; a line circuit controlled by some of said track circuit sections; an auxiliary relay; a pickup circuit for said auxiliary relay; means controlled by a track circuit section for initially closing a break in said pickup circuit; means including said line circuit for permitting the complete closure of said pickup circuit when a train travels in one direction and for preventing such complete closure when a train travels in the opposite direction; means controlled by said line circuit for maintaining said auxiliary relay effectively energized after it has been initially energized so long as said line circuit is open.

71. In combination: a stretch of railway track; a normally closed circuit; track circuits for the stretch including track relays certain of which control said normally closed circuit; a signal; a normally open circuit for the control of said signal; means including an auxiliary relay for closing said normally open circuit; a pick-up circuit for said auxiliary relay including a contact controlled by said normally closed circuit and a back contact of one of said track relays, and a holding circuit for said auxiliary relay.

72. In combination: a stretch of railway track; a signal governing traffic in one direction; track circuits for the stretch including track relays; a normally open signaling circuit; and means for closing said normally open circuit comprising a contact operated by said signal, and a back contact of the first track relay opened by a train passing through the stretch in the direction governed by said signal.

In witness whereof, we subscribe our signatures in the presence of two witnesses.

WILMER W. SALMON.
FRANK L. DODGSON.

Witnesses:
GEORGE T. WHITNEY,
SOPHIE LEVIN.